(12) United States Patent
Lu et al.

(10) Patent No.: US 9,057,915 B2
(45) Date of Patent: Jun. 16, 2015

(54) LIQUID CRYSTAL INTEGRATED CIRCUIT AND METHOD TO FABRICATE SAME

(75) Inventors: Minhua Lu, Mohegan Lake, NY (US); Quinghuang Lin, Yorktown Heights, NY (US); Robert L. Wisnieff, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 13/482,438

(22) Filed: May 29, 2012

(65) Prior Publication Data

US 2013/0321753 A1 Dec. 5, 2013

(51) Int. Cl.
G02F 1/1343 (2006.01)
G02F 1/1337 (2006.01)

(52) U.S. Cl.
CPC .... *G02F 1/133707* (2013.01); *G02F 1/134336* (2013.01); *G02F 1/134363* (2013.01); *G02F 1/13439* (2013.01)

(58) Field of Classification Search
CPC ................ G02F 1/133707; G02F 1/134363
See application file for complete search history.

(56) References Cited

U.S. PATENT DOCUMENTS

| | | | |
|---|---|---|---|
| 5,581,381 A | 12/1996 | Shinjo et al. | |
| 6,583,840 B1* | 6/2003 | Inoue et al. | 349/141 |
| 7,038,754 B2* | 5/2006 | Hirakata et al. | 349/143 |
| 8,085,375 B2 | 12/2011 | Cho et al. | |
| 2005/0007536 A1* | 1/2005 | Hirakata et al. | 349/143 |
| 2006/0077336 A1* | 4/2006 | Hirakata et al. | 349/187 |
| 2011/0128491 A1* | 6/2011 | Kubota et al. | 349/139 |
| 2011/0260957 A1* | 10/2011 | Jeong et al. | 345/98 |
| 2011/0310335 A1* | 12/2011 | Hashimoto et al. | 349/96 |
| 2011/0317104 A1* | 12/2011 | Nakamura et al. | 349/106 |
| 2012/0069283 A1* | 3/2012 | Kizu et al. | 349/141 |

FOREIGN PATENT DOCUMENTS

WO WO 2010110222 A1 * 9/2010

OTHER PUBLICATIONS

Kim et al., "Wall-Shaped Electrodes for Reducing the Oepration Voltage of Polymer-Stabilized Blue Phase Liquid Crystal Displays", Journal of Physics D: Applied Physics, J.Phys.D: Appl. Phys 42 (2009) 235502 (4pp).

Yoon et al., "Optimisation of Electrode Structure to Improve the Electro-Optic Characteristics of Liquid Crystal Display Based on the Kerr Effect", Liquid Crystals, vol. 37, No. 2, Feb. 2012, 201-208, downloaded by University of Central Florida on Feb. 12, 2010, http://www.informaworld.com/smpp/title~content=t713926090.

* cited by examiner

*Primary Examiner* — Michael Caley
*Assistant Examiner* — Jia Pan
(74) *Attorney, Agent, or Firm* — Harrington & Smith; Louis J. Percello

(57) ABSTRACT

A structure includes a first substrate having a first surface and a second substrate having a second surface facing the first surface; liquid crystal material disposed between the first and second surfaces; a first upstanding electrode disposed over the first surface and extending into the liquid crystal material towards the second surface; and a first planar electrode disposed upon the first surface and electrically connected with the first upstanding electrode. The first planar electrode at least partially surrounds the first upstanding electrode. A combination of the first upstanding electrode and the first planar electrode forms at least a portion of a pixel of a liquid crystal display. Various methods to fabricate the structure are also disclosed.

13 Claims, 14 Drawing Sheets

Glass Substrate
10

12
Form PPLK Film
10

12A
Form PPLK Electrode Pattern
10

12A  14
Coat ITO Layer
10

16
Etch ITO to Form ITO Coated PPLK Patterns
10

Glass Substrate

Form PPLK Film

Form PPLK Electrode Pattern

Coat ITO Layer

Etch ITO to Form ITO Coated PPLK Patterns

Glass Substrate

Nanoimprint ITO Ink
Form ITO Patterns

Firing of ITO Ink
into ITO Electrodes

FIG. 7A — Glass Substrate 10
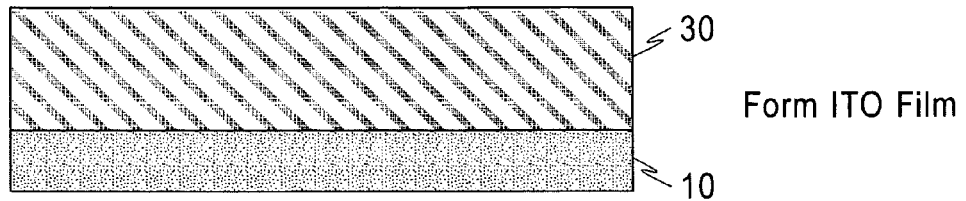
FIG. 7B — Form ITO Film
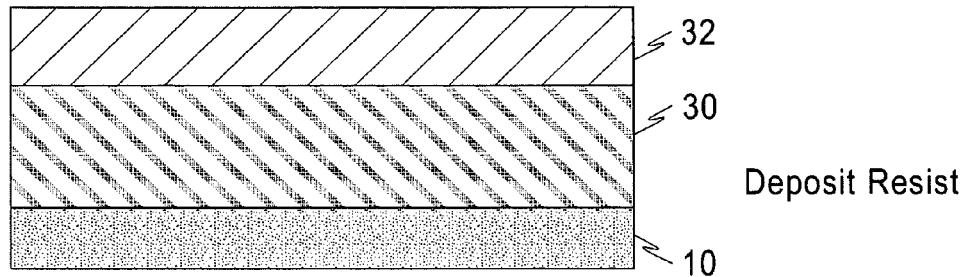
FIG. 7C — Deposit Resist
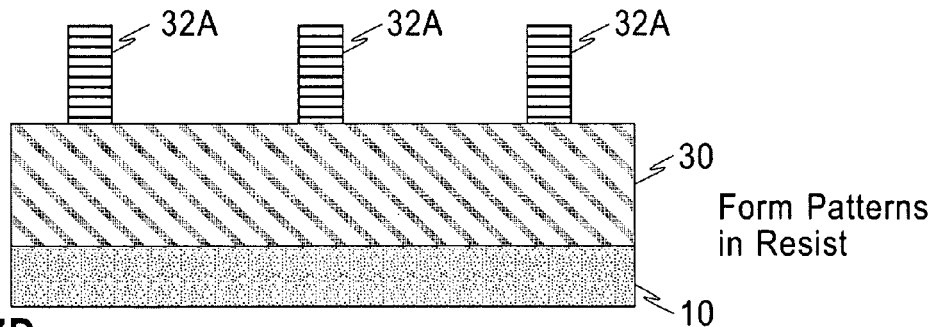
FIG. 7D — Form Patterns in Resist
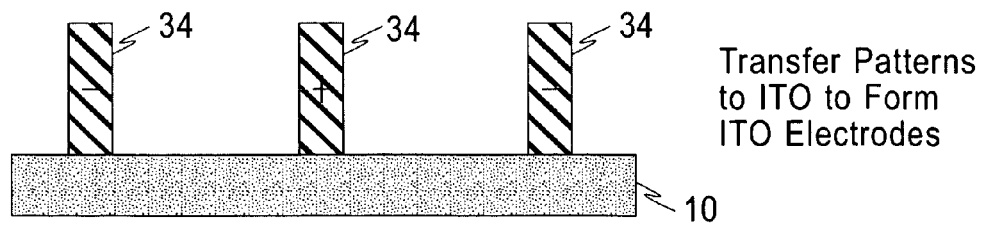
FIG. 7E — Transfer Patterns to ITO to Form ITO Electrodes Glass Substrate Deposit Resist Form Resist Patterns Deposit ITO Ink Firing ITO Ink to Form ITO Electrodes

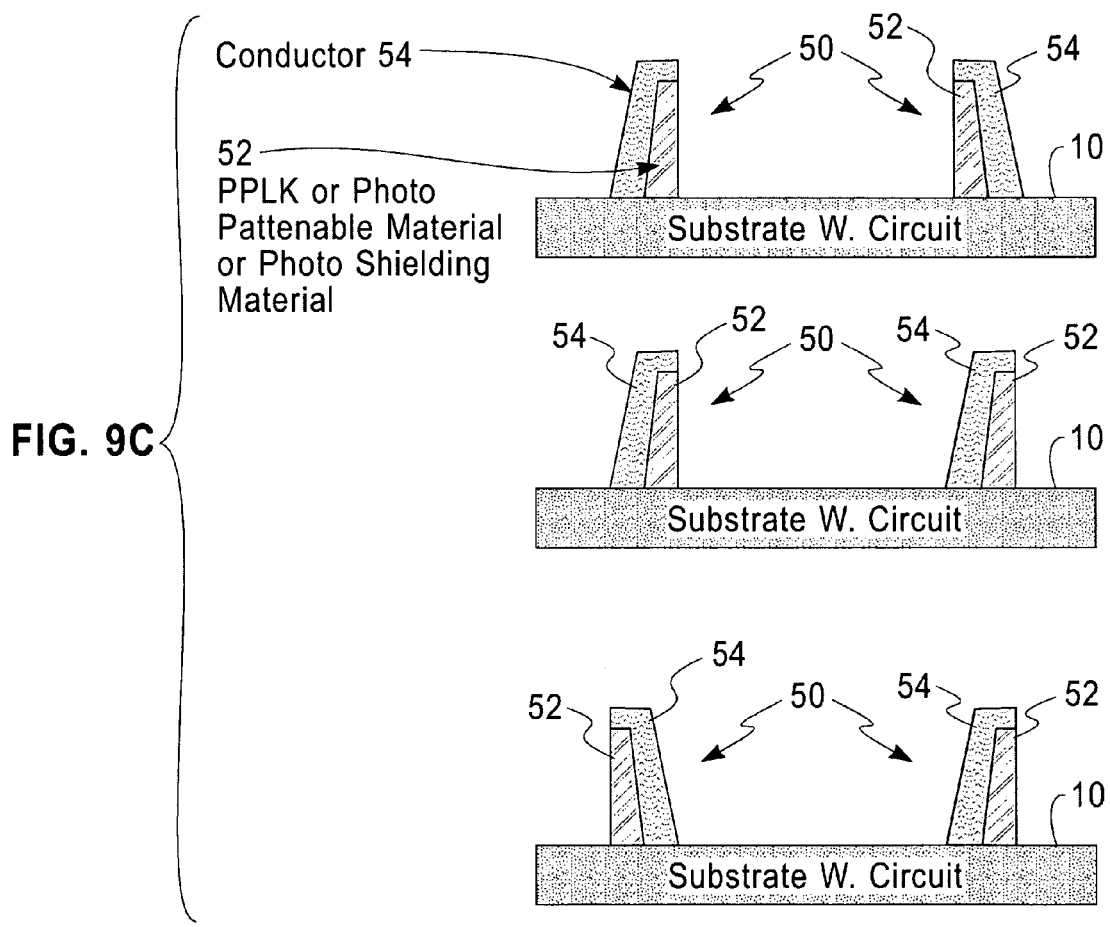

Fin plus planar

US 9,057,915 B2

LIQUID CRYSTAL INTEGRATED CIRCUIT AND METHOD TO FABRICATE SAME

TECHNICAL FIELD

The exemplary embodiments of this invention relate generally to semiconductor devices and fabrication techniques and, more specifically, relate to liquid crystal (LC) devices, such as those used in LC displays (LCDs), and to processes for fabricating such devices and displays.

BACKGROUND

LCDs currently dominate display technology for television, computer monitors and handheld mobile devices. The demand for wide viewing angle, higher brightness, high resolution and fast response time displays increases as graphic and video applications expand into such devices. LCDs utilize an electric field to change the direction of the liquid crystal molecules and to modulate the optical output of the device.

SUMMARY

In a first aspect thereof the exemplary embodiments of this invention provide a structure that comprises a first substrate having a first surface and a second substrate having a second surface facing the first surface; liquid crystal material disposed between the first and second surfaces; a first upstanding electrode disposed over the first surface and extending into the liquid crystal material towards the second surface; and a first planar electrode disposed upon the first surface and electrically connected with the first upstanding electrode, the first planar electrode at least partially surrounding the first upstanding electrode, where a combination of the first upstanding electrode and the first planar electrode forms at least a portion of a pixel of a liquid crystal display.

In a further aspect thereof the exemplary embodiments of this invention provide a method to fabricate electrodes for a liquid crystal display. The method comprises providing a substrate having a surface; coating the surface with a dielectric material; patterning the dielectric material to form a plurality of upstanding first electrode structures each having a height that exceeds a width; coating the upstanding first electrode structures and the substrate surface between upstanding first electrode structures with an electrically conductive material; and removing the electrically conductive material from between two adjacent upstanding first electrode structures so as to retain a portion of the electrically conductive material upon the substrate surface thereby forming substantially planar second electrode structures individual ones of which are electrically continuous with the electrically conductive material that coats an associated upstanding first electrode structure.

In another aspect thereof the exemplary embodiments of this invention provide a method to fabricate electrodes for a liquid crystal display. The method comprises providing a substrate having a surface; depositing a first layer comprised of an electrically conductive material on the surface; depositing a second layer comprised of photoresist on the first layer; selectively removing first portions of the second layer to leave second portions, each second portion being located at a position where an electrode is to be formed; removing those portions of the first layer underlying the second portions of the second layer, and removing the second portions of the second layer, leaving on the surface upstanding first electrode structures each having a height that exceeds a width.

In yet another aspect thereof the exemplary embodiments of this invention provide a method to fabricate electrodes for a liquid crystal display. The method comprises providing a substrate having a surface; depositing a layer comprised of photoresist on the substrate surface; opening apertures through the layer to expose the substrate surface at locations corresponding to positions where an electrode is to be formed; filling the apertures with an electrically conductive material; and removing the layer of photoresist leaving on the surface upstanding first electrode structures comprised of the electrically conductive material, each upstanding first electrode structure having a height that exceeds a width.

BRIEF DESCRIPTION OF THE DRAWINGS

FIGS. 7A-7E, collectively referred to as FIG. 7, show an example of a fourth process (patterned photoresist) suitable to fabricate fin electrodes.

FIG. 9C shows several further variations that beneficially increase sidewall coverage while also providing a larger aperture ratio.

Figure 14A:
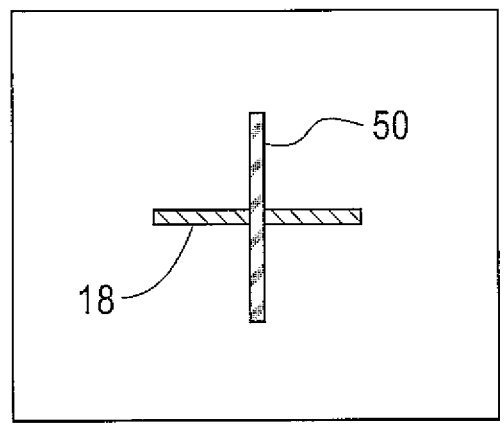
FIGS. 14A and 14B show two different examples of shapes of a combined fin electrode and planar electrode, while FIG.
Figure 14B:
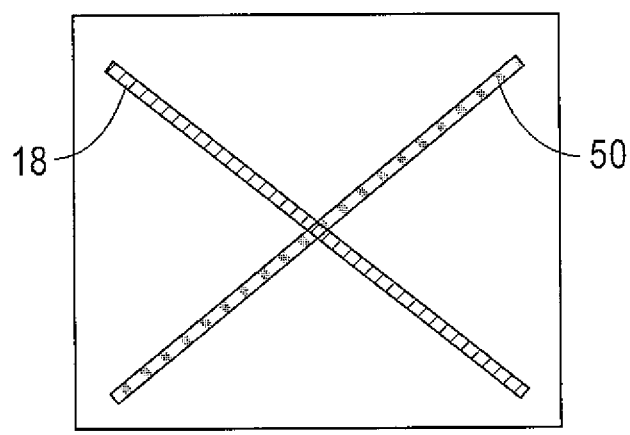

14C shows examples of auxiliary electrodes that can be used with either or both of the shapes of FIGS. 14A and 14B (or other shapes/geometries of the fin electrode and the planar electrode).

DETAILED DESCRIPTION

There are basically two types of LCD electrode configurations. A first configuration can be considered as being somewhat analogous to a parallel capacitor, where planar electrodes are deposited on front and back glass substrates that sandwich a layer of LC material. In this configuration the electric field between electrodes is approximately perpendicular to the glass substrates. Twisted nematic (TN) and vertical alignment (VA) liquid crystal modes use this configuration. The electric field operates to switch LC modules out of the plane (TN) or into the plane (VA) of the substrate. The second type of LCD electrode configuration is referred to as an in-plane switching (IPS) mode, where both positive and negative electrodes are fabricated on the same substrate. The in-plane electrical field that is generated rotates LC molecules parallel to the plane of the substrates and thereby causes a visually apparent effect.

One basic requirement for a LCD is to have a small non-switchable LC transition area (between LCD pixels or picture elements). The gap between the pixel electrode, the thin film transistor (TFT) area that is covered by a black matrix, and the top of the in-plane electrodes are those areas within which LC molecules are not switchable to the desired orientation. In addition, since the LC molecules are typically coupled together by long range forces the distortion due to the presence of a fringe field can typically be larger than the physical dimensions of the gaps between the electrodes. When LC molecules cannot be switched to the desired orientation the image quality, such as brightness, contrast, and viewing angle, is degraded. This is especial true for high resolution display devices.

Many technologies exist for making wide-viewing angle LCDs. In addition to the commonly used twisted nematic (TN) LCDs there are other LCD modes, such as the multi-domain vertical alignment (MVA) mode, a pi-cell mode and the in-plane switching (IPS) mode. A common approach to enlarging the viewing angle of an LCD is to use a multi-domain technology, in which the liquid crystal molecules within a pixel are forced to deform to more than one configuration to compensate for birefringence anisotropy.

Figure 1:
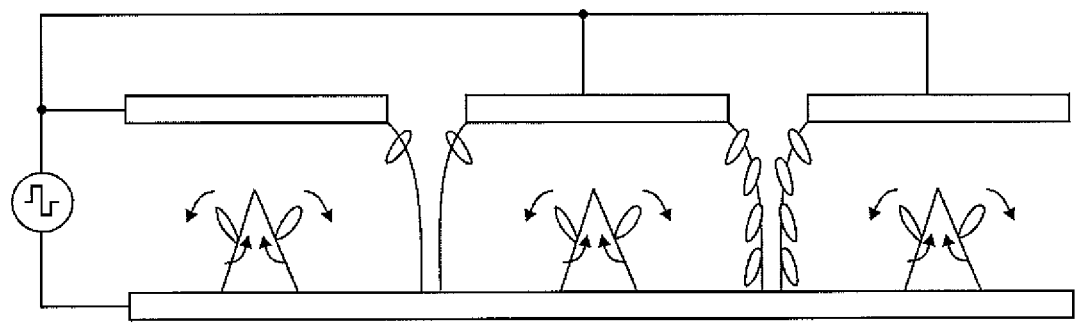
FIG. 1 shows an example of a conventional multi-domain vertical alignment (MVA) mode LCD.

Referring to FIG. 1 a multi-domain VA mode is shown. The VA mode uses homeotropic (vertical) alignment material for an alignment layer, anti-parallel rubbing with a small pre-tilt angle (LC molecules are tilted with a small angle away from the substrate normal direction) for the alignment layer, and negative dielectric anisotropic LC material. Due to the presence of the homeotropic alignment material and the use of the anti-parallel rubbing, in the field off state the liquid crystal director is almost perpendicular to the substrate surface with a small pre-tilt angle (away from the substrate normal). This makes the LC material have virtually no effect on the incident light hitting the display from a normal incident angle. However, the effective birefringence increases rapidly and thus can result in a degradation of image quality in off angles (angles away from the substrate normal). The protruding structures or slits in the electrode are used to assist the LC molecules to tilt into different directions to compensate for the birefringence variations.

Figure 2:
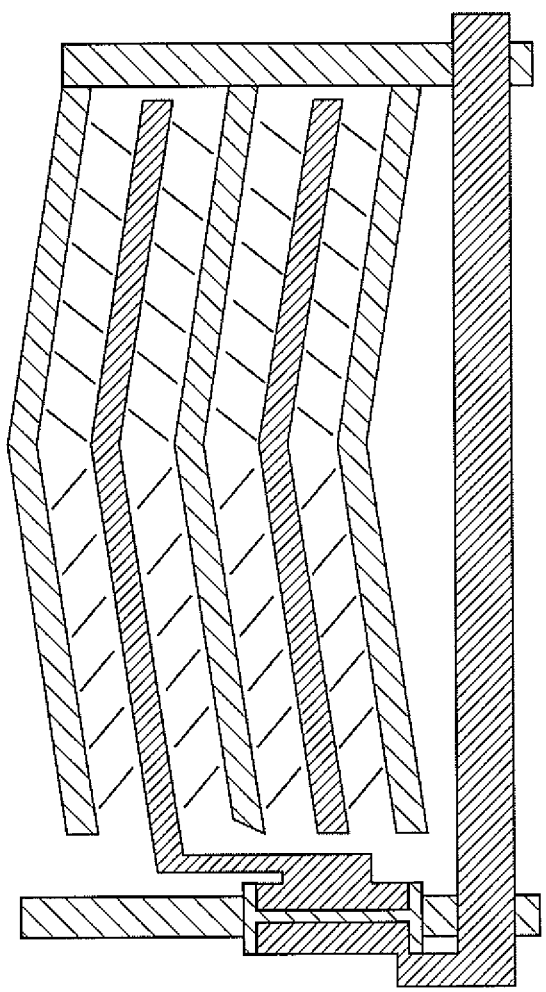
FIG. 2 shows an example of a conventional two domain in-plane switching (IPS) mode LCD.

FIG. 2 shows an example for a two domain IPS mode. In this example the inter-digitated in-plane electrodes have a chevron shape so that the director of the LC molecules is switched to directions to improve the view angle characteristics.

The electrodes in such LCDs are thin film electrodes of a few thousands of Angstroms thickness formed on one substrate (IPS mode) or both substrates (other modes). The fringe field and protruding structures are the elements that force the liquid crystal director into different domains, where protrusions introduce an initial pre-tilt and fringe field that provides an additional inclination in the field on-state to further assist the control of the LC director. Since the electro-optical effect of LC material is determined by orientation of the liquid crystal molecules in the entire display (or pixel), the accurate engineering of the LC director in any state, and in the LCD, is important to improving the viewing angle.

The fringe field generated by slits in planar electrodes is basically less than adequate to provide an improved control of the LC director. This problem is even more aggravated in the IPS mode, where the electrodes are on one substrate and the bulk liquid crystals, especially near the opposite substrate, are switched by a fringe field. Furthermore, the presence of a weak electrical field also implies a slower response time.

Figure 3:
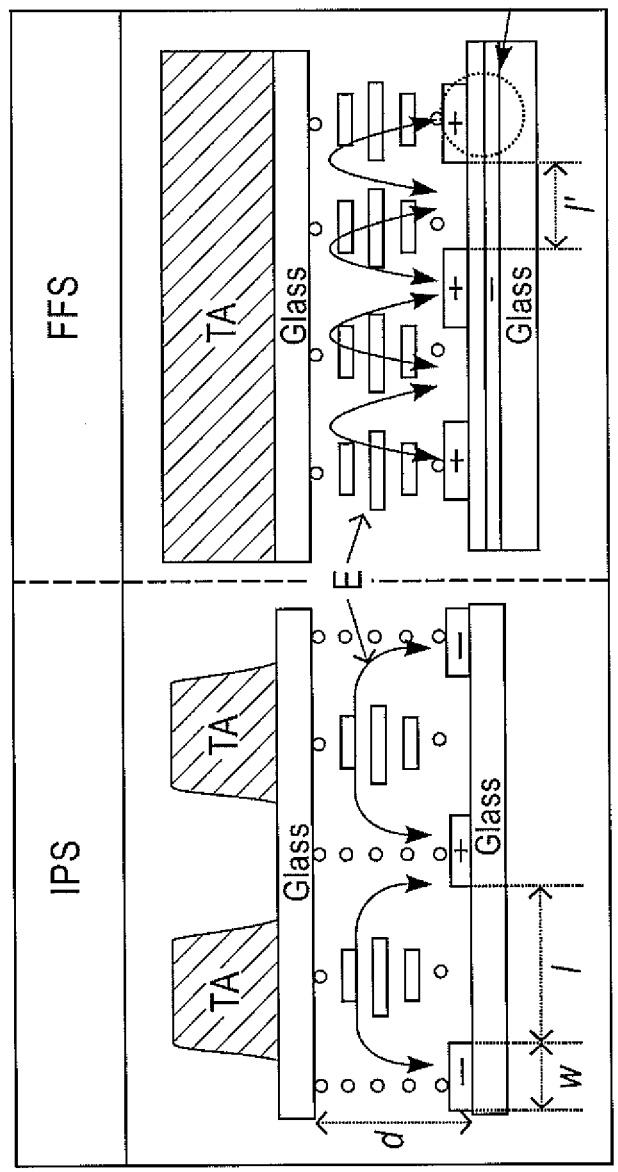
FIG. 3 shows an example of a conventional fringe field switched (FFS) mode LCD (right side, contrasted with the conventional IPS mode LCD, left side).

FIG. 3 shows an illustration of electrode configurations for the IPS mode and the fringe field switch (FFS) mode, where the FFS mode can be considered as a modified IPS mode. As opposed to the use of inter-digitized electrodes in the IPS mode, in the FFS mode a counter electrode is moved beneath comb electrodes that are separated by a layer of dielectric. One advantage of the FFS mode is a presence of a stronger fringe field and an improved control of the LC director resulting in an increased optical throughput and faster switching. However, the fringe field is still the dominant driving force, and control of the LC director remains limited.

The embodiments of this invention provide a display with non in-plane (non-planar) electrodes. The use of non-planar electrodes implies that the height of the electrodes is comparable to or larger than the width of the electrode. The use of non-planar electrodes further implies that the shape/geometry of the electrode can be other than a simple sheet with protruding bumps. In the use of the non-planar electrodes there can be significant portions of electrodes out of the plane of the substrate that provide modification to the electrical field generated by conventional planar electrodes.

In certain embodiments of this invention a photo-patternable low dielectric constant (low-k) (PPLK) material can serve as both a photoresist material and as a permanent on-chip insulator, after patterning and curing. In certain embodiments of this invention high aspect ratio structures are formed by patterning PPLK material utilizing a single exposure process. After patterning of the PPLK material, the patterned PPLK material can be converted into a permanently patterned on-chip material by curing to form a PPLK structure. A thin film electrode material can then be used to coat over the PPLK structure and other features to form LCD pixel electrodes. For convenience such non-planar electrodes can be referred to as "fin" electrodes. Non-limiting examples of PPLK materials include, but are not limited to, some organic polymers.

Figure 4A:
FIGS. 4A-4E, collectively referred to as FIG. 4, show an example of a first process (PPLK coated with ITO) suitable to fabricate fin electrodes.
Figure 4B:
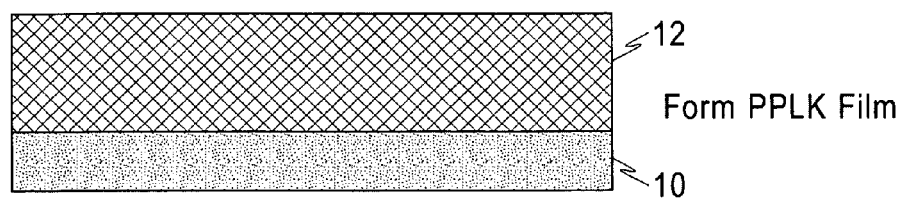

An example of a first process suitable to fabricate fin electrodes is depicted in FIGS. 4A-4E, collectively referred to as FIG. 4. In FIG. 4A an electrically insulating substrate, such as a glass substrate 10, is provided with thin film transistors, wiring and connecting vias pre-formed where needed by the requirements of the LCD to be fabricated. In FIG. 4B a layer 12 of PPLK material is deposited by any suitable technique, such as a spin-on process, to a desired thickness. An optional anti-reflective coating may be deposited on the substrate 10 prior to the deposition of the PPLK material when necessary.

Figure 4C:
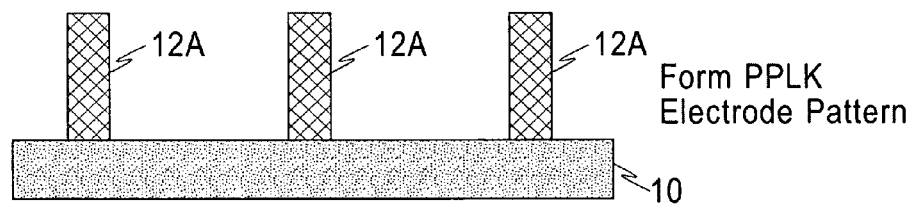
Figure 4D:
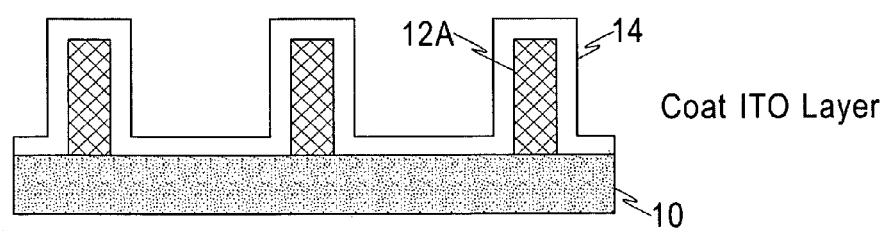
Figure 4E:
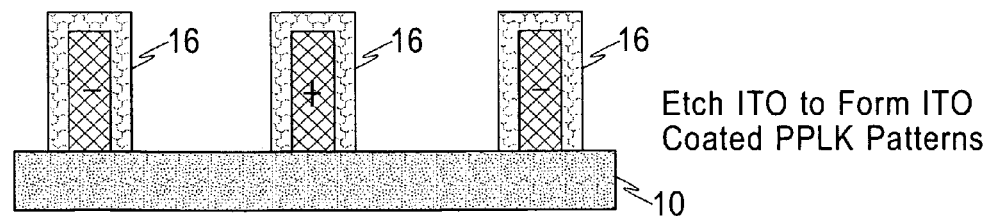
Figure 5A:
FIGS. 5A-5E, collectively referred to as FIG. 5, show an example of a second process (PPLK coated with ITO) suitable to fabricate fin electrodes and associated planar electrodes.
Figure 5B:
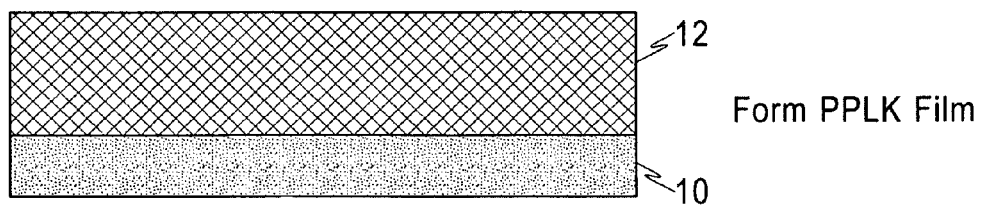
Figure 5C:
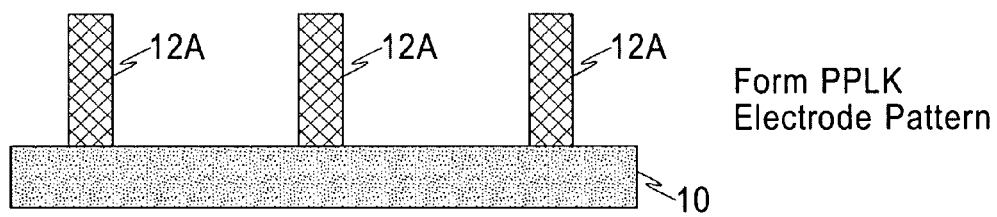
Figure 5D:
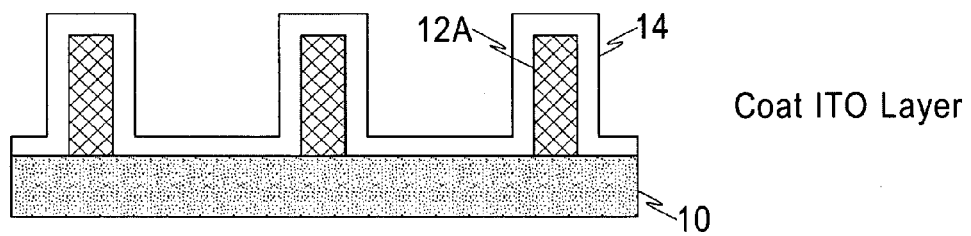
Figure 5E:
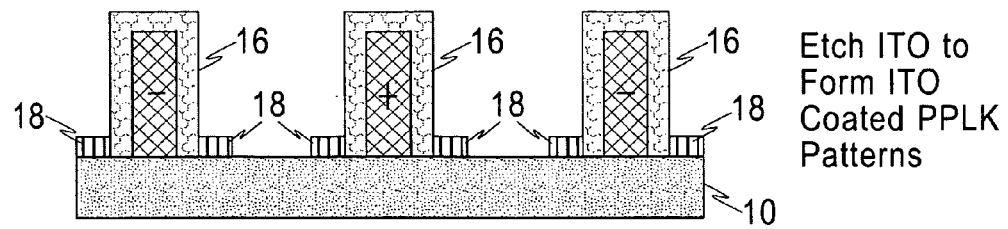

In FIG. 4C the PPLK layer 12 is patterned to conform to a desired electrode pattern 12A, such as by optical lithography or other patterning techniques. Suitable but non-limiting optical lithography processes include I-line, DUV (e.g., 248 nm, 193 nm), EUV, E-beam and laser direct write, contact printing, as well as nano-imprint processes. In FIG. 4D an electrically conductive material, such as an indium-tin-oxide (ITO) layer 14 is applied. Suitable ITO coating techniques can include, for example, sputtering, thermal evaporation and spray pyrolysis. In FIG. 4E the unnecessary ITO between electrodes is removed such as by the use of a directional ITO etch, e.g., a reactive ion etch (RIE). This can be a dry etch (RIE) process based on, for example, hydrocarbon, $H_2$, $O_2$, Ar, etc. The use of a wet etch is another option for ITO removal. The end result is the formation of ITO-coated PPLK patterns as the fin electrodes 16.

An example of a second process suitable to fabricate fin electrodes and associated planar electrodes is depicted in FIGS. 5A-5E, collectively referred to as FIG. 5. The processes shown in FIGS. 5A-5D can be essentially identical to the processes shown in FIGS. 4A-4D. However, in FIG. 5E not all of the ITO material between the final electrodes 16 is removed thereby forming substantially planar electrodes 18 disposed horizontally between the vertically disposed electrodes 16. The unwanted ITO material can be removed, as in FIG. 4, e.g., a dry etch (RIE) process based on, for example, hydrocarbon, $H_2$, $O_2$, Ar, etc. The use of a wet etch is another option for ITO removal. The end result is the formation of ITO coated PPLK patterns as the fin electrodes 16 and associated planar electrodes 18. The thickness of the planar electrode 18 will generally be a fraction (e.g., less than 50%, or less than 25%, or less than 10%) of the height of the associated fin electrode 16. The individual planar electrodes 18 can be seen to be electrically continuous with their associated fin electrode 16.

Figure 6A:
FIGS. 6A-6C, collectively referred to as FIG. 6, show an example of a third process (nano-imprinting) suitable to fabricate fin electrodes.
Figure 6B:
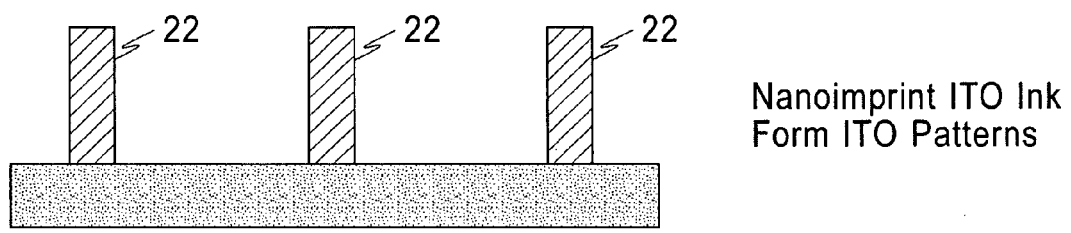
Figure 6C:
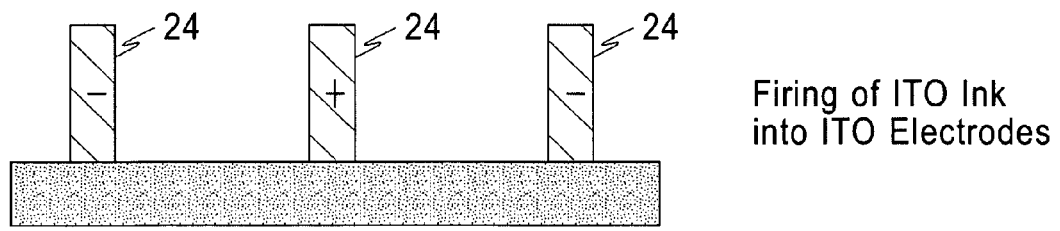

An example of a third process suitable to fabricate IPS fin electrodes is depicted in FIGS. 6A-6C, collectively referred to as FIG. 6. In FIG. 6A the glass substrate 10 is provided with thin film transistors, wiring and connecting vias pre-formed where needed. In FIG. 6B an ITO ink pre-pattern 22 is printed by a suitable direct patterning technique. The suitable patterning techniques include, but not limited to, direct patterning of ITO ink by nano-imprint, inject printing or other contact printing techniques. The ITO ink can be, for example, a solution or mixture or suspension of ITO, a polymer binder and a solvent. The resolution range of the ITO pre-patterns 22 are, for example, about 10 nm to about 10 µm. In FIG. 6C the ITO ink is fired (thermally processed) to form ITO electrodes 24, such as by a thermal process conducted at about 500° C.-600° C. for about 30 minutes to about 120 minutes in air, $N_2$, or He gas (as non-limiting examples of temperatures, times and atmospheres). Note that depending on the characteristics of the ITO ink that more than one printing operation can be used to build up the ITO pre-patterns 22 to the desired thickness that will correspond to the height of the completed ITO electrodes 24.

Note also in this embodiment that planar electrodes, similar to the electrodes 18 as in FIG. 5, can be deposited prior to the deposition of the ITO ink 20, and the fin electrodes 24 can then be subsequently formed upon the planar electrodes.

An example of a fourth process suitable to fabricate IPS fin electrodes, using lithography and an etch (wet or dry) is depicted in FIGS. 7A-7E, collectively referred to as FIG. 7. In FIG. 7A the glass substrate 10 is provided with thin film transistors, wiring and connecting vias pre-formed where needed. In FIG. 7B an ITO film layer 30 is formed to a desired thickness. The ITO film layer 30 can be deposited by, for example, sputtering, thermal evaporation and/or spray pyrolysis. In FIG. 7C a layer 32 of photoresist is applied over the ITO film layer 30. In FIG. 7D patterns 32A (e.g., apertures such as trenches) are formed in and through the resist layer 32, the patterns 32A being formed where fin electrodes are desired to be formed in FIG. 7E. The patterns 32A can be formed by I-line, DUV (248 nm, 193 nm), nano-imprint, contact printing, contact printing, laser or e-beam direct write and the like. In FIG. 7E the patterns 32A are transferred into the ITO film layer 30 to form ITO electrodes 34. The pattern transfer process can include the use of a wet etch such as one using an HCl etchant or a dry etch (RIE) such as one using hydrocarbon, $H_2$, $O_2$, or Ar.

As another embodiment the blank ITO film layer 30 can be applied by the use of ITO ink. In this case then ITO electrodes 34 can be fired, as in the embodiment of FIG. 6, to form the completed ITO fin electrodes 34, or the ITO film layer 30 could be fired prior to patterning.

Note in this embodiment that the planar electrodes, similar to the electrodes 18 as in FIG. 5, can be deposited prior to the deposition of the ITO film 30, and the fin electrodes 34 can then be subsequently formed upon the planar electrodes.

Figure 8A:
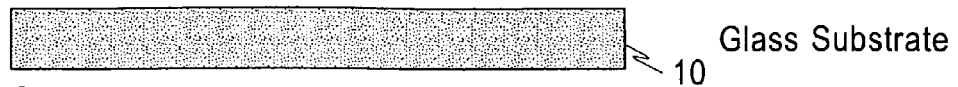
FIGS. 8A-8E, collectively referred to as FIG. 8, show an example of a fifth process (lithography and liftoff of ITO ink) suitable to fabricate fin electrodes.
Figure 8B:
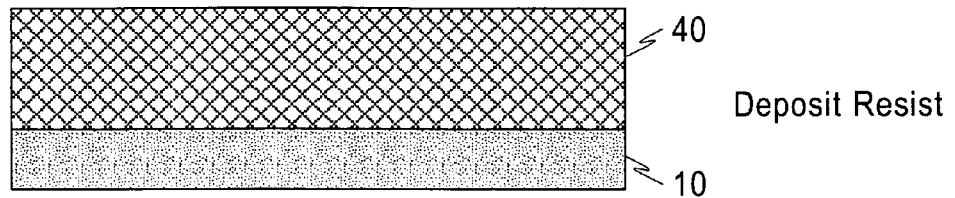
Figure 8C:
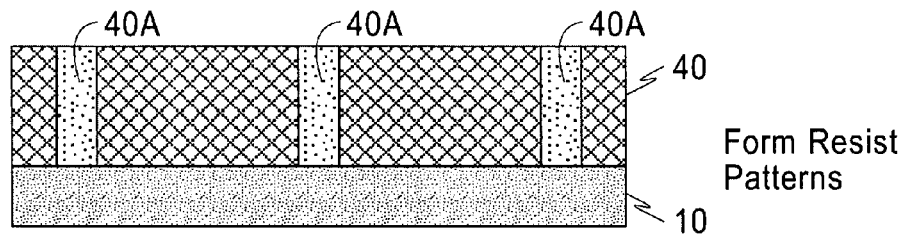
Figure 8D:
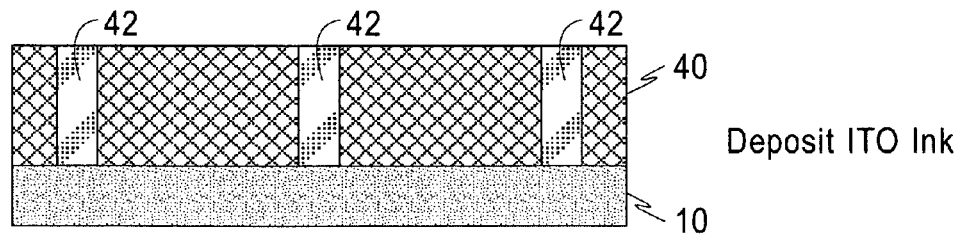
Figure 8E:
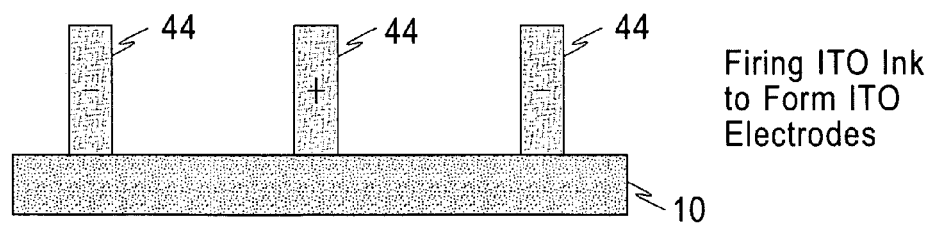

An example of a fifth process suitable to fabricate IPS fin electrodes using lithography and a liftoff process is depicted in FIGS. 8A-8E, collectively referred to as FIG. 8. In FIG. 8A the glass substrate 10 is provided with thin film transistors, wiring and connecting vias pre-formed where needed. In FIG. 8B a layer 40 of photoresist is deposited in the surface of the substrate 10. In FIG. 8C patterns 40A (apertures such as trenches) are formed in the resist layer 40, the patterns 40A being formed where fin electrodes are desired to be formed in FIG. 8E. The patterns 40A can be formed by I-line, DUV (248 nm, 193 nm), nano-imprint, contact printing, laser or e-beam direct write and the like. In FIG. 8D ITO ink 42 is deposited so that it at least fills or partially fills the patterns 40A formed in the photoresist 40. In FIG. 8E the ITO ink 42 is fired to form ITO electrodes 44, such as by a thermal process conducted at about 500° C.-600° C. for about 30 minutes to about 120 minutes in air, $N_2$, or He gas (as non-limiting examples of temperatures, times and atmospheres). The photoresist layer 40 can be removed during the firing of the ITO ink and/or with other techniques such as, but not limited to, wet removal by a solvent or solution, or by use of a UV ozone removal technique. Removal of the photoresist layer 40 also serves to lift-off any fired ITO material that exists on the surface of the photoresist layer 40, thereby leaving only the ITO fin electrodes 44.

Note also that in this embodiment that the planar electrodes, similar to the electrodes 18 as in FIG. 5, can be deposited prior to the deposition of the photoresist layer 40, and the fin electrodes 44 can then be subsequently formed upon the planar electrodes.

The various fabrication methods described in relation to FIGS. 4-8, i.e., nano-imprinting, lithography and etch, lithography and lift-off, can be used as well to fabricate other configurations of electrodes for LCDs.

Figure 9A:
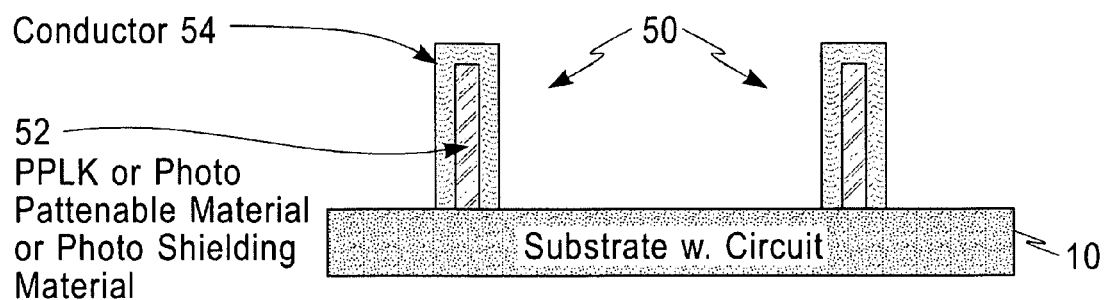
FIG. 9A shows a fin (upstanding) electrode as fabricated by the processes of either FIG. 4 or 5.
Figure 9B:
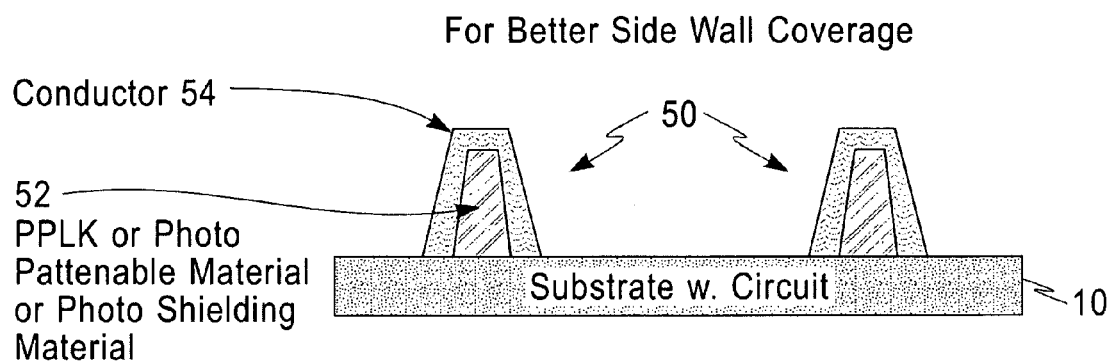
FIG. 9B shows a variation of the fin electrode structure where the fin electrode sidewalls are tapered so as to enhance coverage of the sidewalls with the electrical conductor.

FIG. 9A shows an exemplary fin electrode 50 as fabricated by the processes of either FIG. 4 or 5. The fin electrode has a core 52 comprised of PPLK or some other photo-patternable material or photo-shielding material. Over the core 52 is the layer 54 of electrical conductor, such as ITO. FIG. 9B shows a variation on this structure where the fin electrode sidewalls are tapered so as to enhance the coverage of the fin electrode sidewalls with the conductor layer 54. As can be seen, at least one sidewall of the fin electrode 50 is disposed at other than 90° to the surface of the substrate 10. FIG. 9C shows several further variations that beneficially increase sidewall coverage while also providing a larger aperture ratio. Note in the embodiments of FIG. 9C that only one tapered sidewall and the top of the fin electrode 50 is covered with the conductive layer 54. The vertical sidewall provides a horizontal field and reduces the area of the fin electrode 50.

Figure 10A:
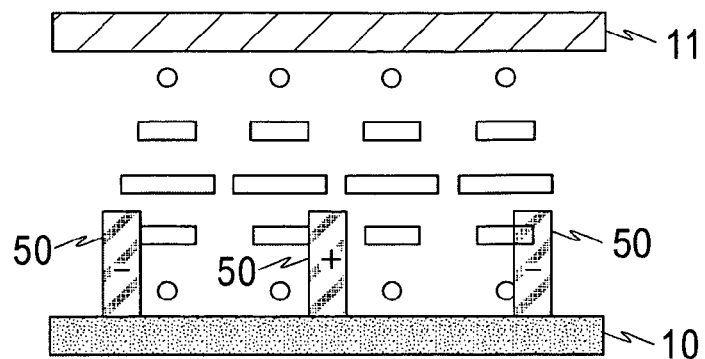
FIG. 10A shows an arrangement of inter-digitated, both pixel and common, fin electrodes formed on the same substrate.
Figure 10B:
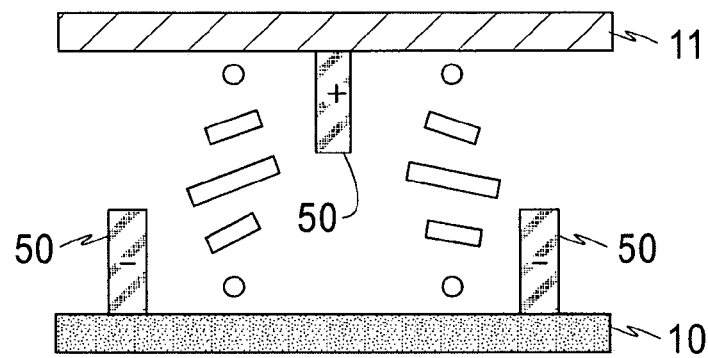
FIG. 10B shows an embodiment where negative (common) fin electrodes are formed on a first substrate and positive (pixel) fin electrodes are formed on an opposing second substrate.
Figure 10C:
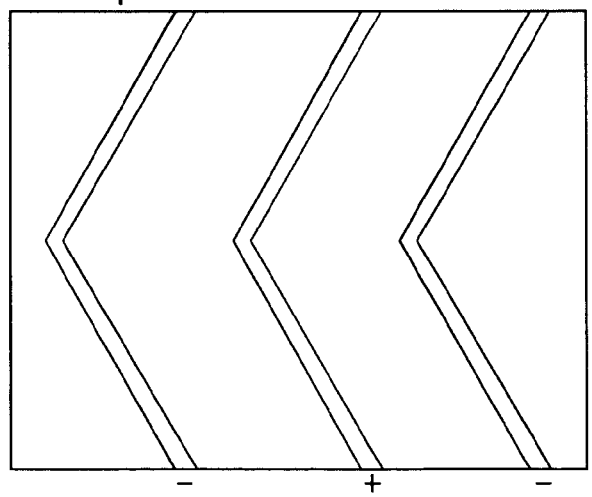
FIG. 10C is a top view of the fin electrodes of either FIG. 10A or 10B where the fin electrode is shaped to form multiple domains.

FIG. 10A shows the arrangement of fin (inter-digitated, both pixel and common) electrodes 50 all formed on the same substrate 10 as in FIGS. 9A-9C with the conductor-coated core 52. Alternatively the fin electrodes 50 could be formed of high aspect ratio conductors and could be implemented using any of the processes of FIGS. 6-8. In addition, any of the fin electrodes 50 can include the underlying planar electrodes 18 as was shown in FIG. 5. In FIG. 10B there is shown an embodiment where the negative (−) fin electrodes 50 are formed on the substrate 10 and positive (+) fin electrodes 50 are formed on an opposing substrate 11 (pixel electrodes on one substrate and common electrodes on the other substrate). In this case, and comparing to FIG. 10A, it can be seen that the horizontal field is not perfectly horizontal. FIG. 10C is a top view of the fin electrodes 50 of either FIG. 10A or 10B, where it can be seen that the fin electrodes 50 can have a basically chevron or other desired shape, e.g., a zig-zag shape, to form multiple domains. The pixel and common electrodes can be either on one substrate or on two substrates. The fin electrodes 50 can be used in the IPS mode.

Figure 11:
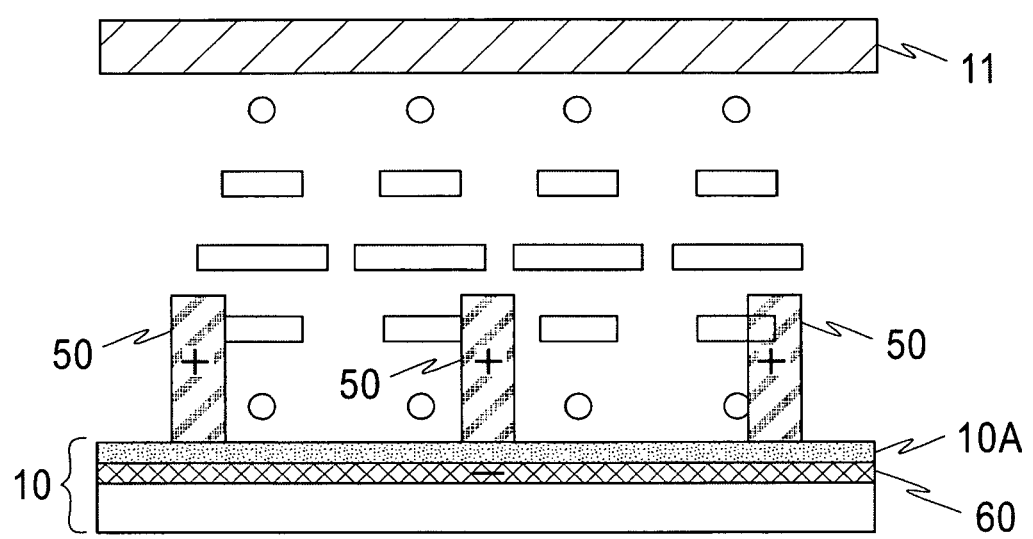
FIG. 11 shows an example of a fringe field switch (FFS) mode LCD where a common electrode is an electrode disposed beneath the pixel fin electrodes and separated therefrom by a dielectric layer.

FIG. 11 shows an example of a fringe field switch (FFS) mode LCD. In this case the common electrode (−) is a planar electrode 60 disposed beneath the pixel (+) fin electrodes 50 and separated by a dielectric layer 10A. The pixel electrodes can be high aspect ratio fin electrodes 50 to enhance the electric field and control of the liquid crystal director. The use of this embodiment can provide a higher fringe field, faster switching times, a wider viewing angle and a higher transmittance.

Figure 12A:
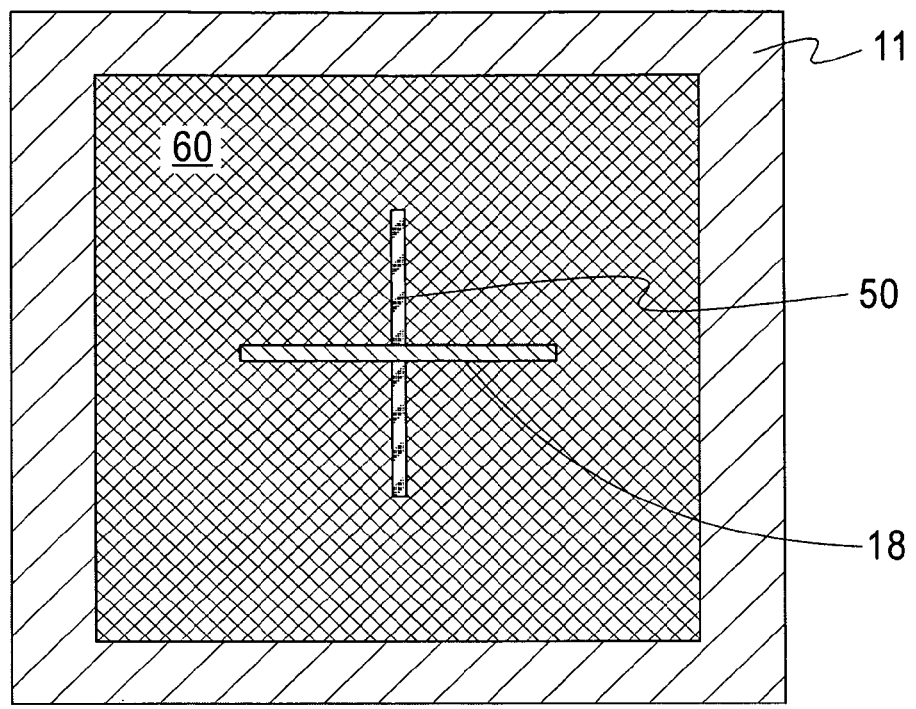
FIG. 12 (FIG. 12A (top view) and FIG. 12B (side view)) shows an embodiment where the fin electrode is used in the MVA mode, where the common electrode is disposed on a first substrate and the fin pixel electrode is combined with a planar electrode.
Figure 12B:
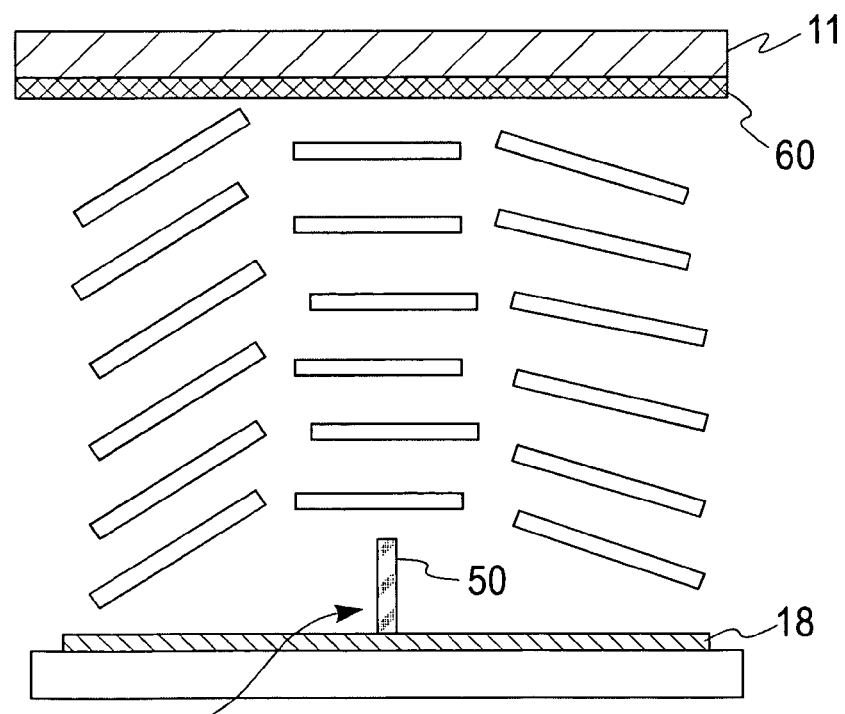

FIG. 12 shows an embodiment where the fin electrode 50 is used in the MVA mode. In FIG. 12A (top view) and FIG. 12B (side view) a combination of the fin electrode 50 and the planar electrode 18 can be seen. In this embodiment the common electrode (−) 60 is disposed on the upper substrate 11 and the fin electrode 50 (pixel electrode (+)) structure is combined with the planar electrode 18. The planar electrode 18 can be used as either a pixel electrode or a common electrode, or as both throughout the LCD. The fin electrode 50 structure can be one or multiple structures located on or in the vicinity of a pixel. The overall shape/geometry of the fin electrode 50 and the planar electrode 18 can be semi-spherical, ridge, cross (as shown), star or other patterns.

Figure 13B:
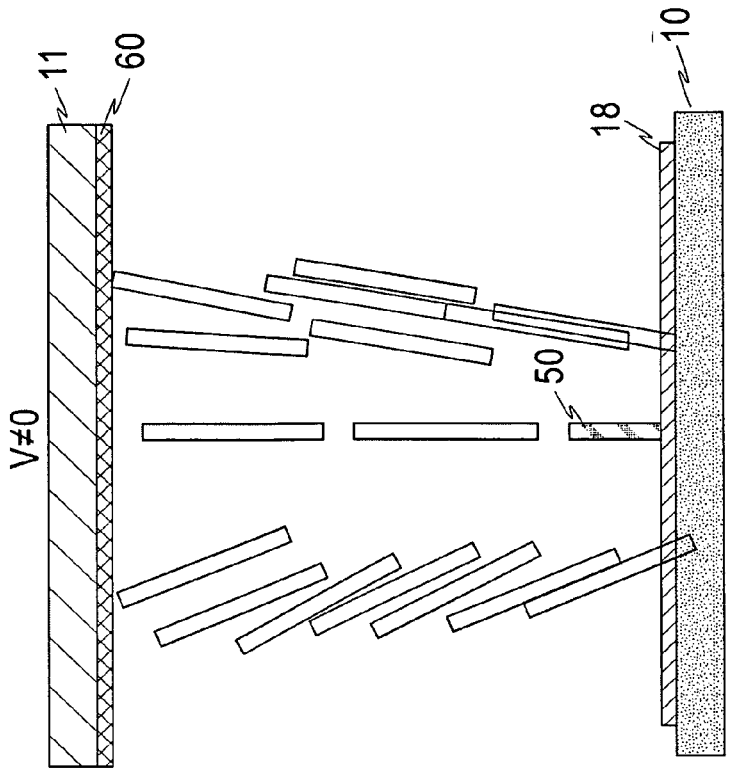
FIGS. 13A and 13B show an embodiment of the fin electrode and the planar electrode used in an electrically controlled birefringence (ECB) mode of operation.
Figure 13A:
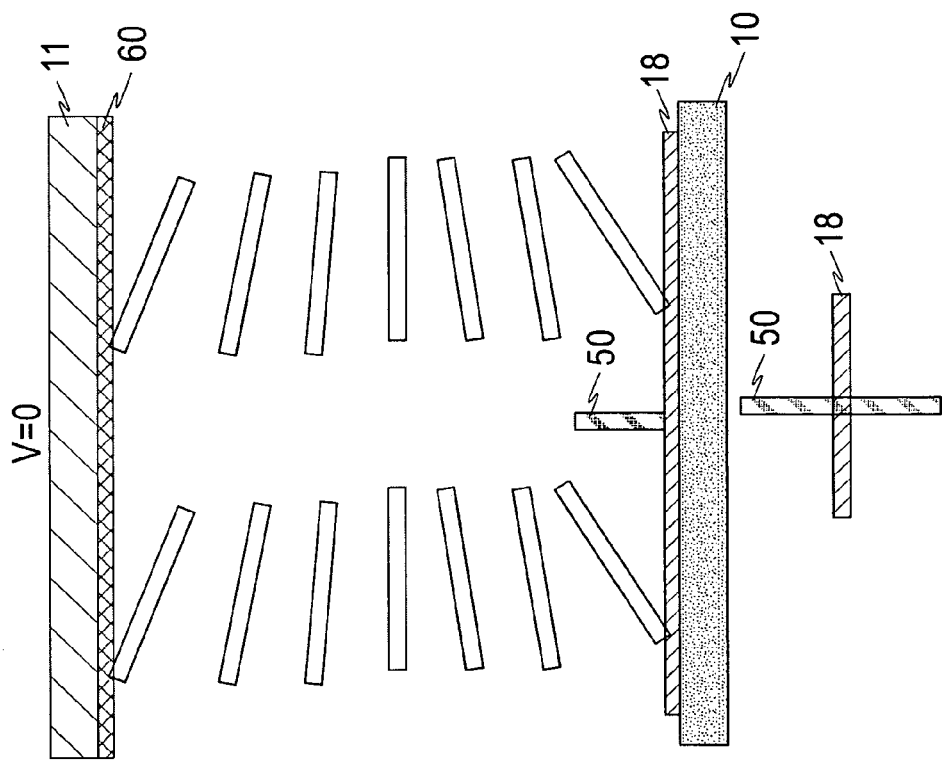

FIG. 13 shows an embodiment the fin electrode 50 and the planar electrode 18 are used in an electrically controlled birefringence (ECB) mode of operation. In this exemplary case the fin electrode structure combined with the planar electrode structure (in the exemplary cross pattern as in FIG. 12) can be used as either pixel electrodes, or common electrode, or both. In FIG. 13A (side view, V=0) and FIG. 13B (side view, V≠0) a combination of the fin electrode 50 and the planar electrode 18 on the substrate 10 with an opposing electrode 60 on the substrate 11 can be seen. As in FIG. 12, the fin electrode 50 structure can be one or multiple structures located on or in the vicinity of a pixel, and the overall shape/geometry of the fin electrode 50 and the planar electrode 18 can be semi-spherical, ridge, cross, star or other patterns. The fin structure can be on either one or both electrodes.

Figure 14C:
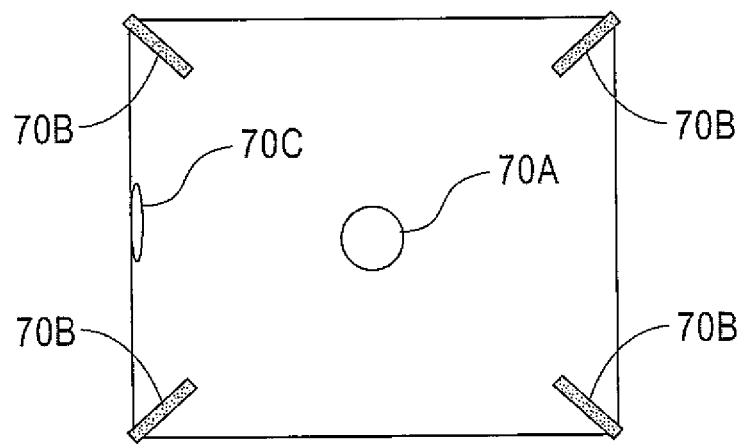

One or more auxiliary electrodes within a pixel, which can be either a fin electrode 50 and/or a planar electrode 18, can be employed as a sub-pixel that can be used for precise control of the LC director. FIGS. 14A and 14B show two different examples of shapes of the combined fin electrode 50 and planar electrode 18, where FIG. 14A shows the cross shape (as in FIGS. 12 and 13) and FIG. 14B shows an "X" shape. FIG. 14C shows examples of auxiliary electrodes 70 that can be used with either or both of the shapes of FIGS. 14A and 14B (or other shapes/geometries of the fin electrode 50 and the planar electrode 18). The auxiliary electrodes can be either on the pixel (as in the auxiliary electrode 70A), at the periphery of the pixel (as in the auxiliary electrodes 70B) or in between pixels (as in the auxiliary electrode 70C). The auxiliary electrodes 70 can assume any two-dimensional or three-dimensional shape. The auxiliary electrode(s) 70 can be electrically connected to the main electrodes or they can be operated separately from the main electrodes.

It is noted that the various embodiments of the fin electrodes 50, with or without associated planar electrodes 18 and/or auxiliary electrodes 70, can be used with a blue phase liquid crystal (BPLC) mode, and inter-digitated electrodes can be on one or two substrates.

As should be apparent the exemplary embodiments of this invention provide in one aspect thereof methods for forming a fin electrode structure in an LCD. In addition to the presence of the optional planar electrode 18 deposited in the plane of the substrates 10/11, an electrode positioned in between the two substrates provides additional control of the electrical field within the LC cell to maximize the control of the liquid crystal directors throughout the LC display for enhancing image quality. One example of this type of electrode is the fin electrode 50. The fin electrode 50 can have dimensions of, for example, a width of about 100 nm and a height of about 1 μm protruding into the LC cell (e.g., the height to width ratio may be about 10, or less than 10, or greater than 10). One advantage of the use of this invention is an enhancement in the precise control of the LC director throughout LC display to improve the image quality.

As should be further apparent the exemplary embodiments of this invention provide in another aspect thereof a LCD with non in-plane electrodes, where the height of the non-planar electrode is comparable to or larger than the width of the electrode where some significant portion of the electrode extends out of the plane of the substrate to provide a modification to the electric field generated by one or more associated planar electrodes.

As should be further apparent the exemplary embodiments of this invention provide in another aspect thereof the use of a photo-patternable material, such as PPLK material, that can serve as both a photoresist material and as a permanent on-chip insulator, after patterning and curing. In one process high aspect ratio structures are formed by patterning PPLK material utilizing a single exposure process. After patterning of the PPLK material, the patterned PPLK material can be converted into a permanent patterned on-chip material by curing. A thin film electrode is coated onto the PPLK structure and other features to form pixel electrodes.

In an embodiment the PPLK fin structure is formed first, ITO is sputtered on top of the PPLK fin structure, and then patterning is performed to form fin electrodes 50.

In an embodiment the PPLK fin structure is formed first, ITO sputtered on top ITO is sputtered on top of the PPLK fin structure, and then patterning is performed to form fin electrodes 50 and planar electrodes 18.

In other embodiments fin electrodes 50 can be formed by the use of nano-imprinted ITO ink, or by the use of a thick ITO film that is deposited followed by lithography and an RIE to pattern the ITO, or by the use of a layer of photoresist that is deposited followed by lithography and an RIE or a liftoff process. A trench fill with ITO ink or some other suitable conductor can be accomplished to form the fin electrodes 50.

In some embodiments the sidewalls of the fin electrodes 50 can be optimized in increase sidewall coverage with the electrical conductor as well as to achieve a larger aperture ratio. Optimization of the sidewall can include tapering one or more sidewalls of the fin electrodes 50.

In some embodiments the fin electrodes 50 are used in the IPS mode and inter-digitated electrodes, both pixel and common electrodes, are on the same substrate.

In some embodiments the fin electrodes 50 are used in the IPS mode and the inter-digitated electrodes, pixel and common electrodes, are on different substrates.

In some embodiments the fin electrodes 50 are used in the IPS mode and the inter-digitated electrodes take a chevron shape or a zig-zag shape or some other shape to form multiple domains, where the pixel and common electrodes can be either on one substrate or on two substrates.

In some embodiments the fin electrodes 50 are used in the FFS mode and the common electrode is beneath the pixel electrodes, separated by a dielectric layer, where the pixel electrodes are high aspect ratio fin electrodes 50 to enhance the electric field and control of the LC director.

In some embodiments the fin electrodes 50 are used in the MVA mode where the fin electrode 50 structure is combined with one or more planar electrodes 18 used as either pixel electrodes, or common electrodes, or both. The fin electrode 50 structure can be one or multiple structures located on or in the vicinity of pixel. The overall shape can be, for example, semi-spherical, a ridge, a cross, a star or other patterns.

In some embodiments the fin electrodes 50 are used in the BPLC (blue phase liquid crystal) mode, where inter-digitated fin electrodes can be on one or two substrates.

In some embodiments the fin electrodes 50 are used in the ECB (electrically controlled birefringence) mode, where the fin electrode 50 structure combined with one or more planar electrodes 18 are use as either pixel electrodes, or common electrode, or both. The fin electrode 50 structure can be one or multiple structures located on or in the vicinity of pixel. The overall shape can be, for example, semi-spherical, a ridge, a cross, a star or other patterns. The fin electrode 50 structure can be on either one or both substrates.

In some embodiments the auxiliary electrodes 70 can be employed. The auxiliary electrodes 70 can be either a fin electrode structure or a planar electrode structure and can function as a sub-pixel that can provide enhanced control of the LC director. The auxiliary electrodes 70 can be located at one or more of: on the pixel, at the periphery of the pixel, or between pixels. The auxiliary electrodes 70 can take any 2D or 3D shape and can be electrically connected to the main electrodes or can be operated separately therefrom.

It should be appreciated that the various examples of the electrodes described above are amendable to being fabricated as a part of an integrated circuit either alone or in combination with other components, such as those found in displays for portable handheld devices such as communication devices, displays for computers, and displays for televisions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent semiconductor fabrication processes, including deposition processes, etching processes may be used by those skilled in the art. Further, the exemplary embodiments are not intended to be limited to only those materials, metals, insulators, dopants, dopant concentrations, layer thicknesses and the like that were specifically disclosed above. Any and all such and similar modifications of the teachings of this invention will still fall within the scope of this invention.

What is claimed is:

1. A structure comprising:
a first substrate having a first surface and a second substrate having a second surface facing the first surface;
liquid crystal material disposed between the first and second surfaces;
a first upstanding electrode disposed over the first surface and extending into the liquid crystal material towards the second surface; and
a first planar electrode disposed upon the first surface and electrically connected with the first upstanding electrode, the first planar electrode at least partially surrounding the first upstanding electrode, where a combination of the first upstanding electrode and the first planar electrode forms at least a portion of a pixel of a liquid crystal display;
where a first sidewall of the first upstanding electrode is a tapered sidewall disposed at other than 90° to the first surface and where a second sidewall of the first upstanding electrode that is opposite to the first sidewall of the first upstanding electrode is a vertical sidewall disposed at 90° to the first surface;
where the first upstanding electrode is comprised of a non-electrically conducting core that is coated with an electrically conductive material on a top surface thereof and on the tapered first sidewall but not on the vertical second sidewall.

2. The structure as in claim 1, further comprising:
a second upstanding electrode disposed over the first surface and extending into the liquid crystal material towards the second surface; and
a second planar electrode disposed upon the first surface and electrically connected with the second upstanding electrode, the second planar electrode at least partially surrounding the second upstanding electrode, where a combination of the second upstanding electrode and the second planar electrode, and the first upstanding electrode and the first planar electrode, forms at least a portion of the same pixel of the liquid crystal display.

3. The structure of claim 2, where the first upstanding electrode is electrically biased to a first potential and where the second upstanding electrode is electrically biased to a common potential.

4. The structure of claim 1, where the first planar electrode is formed of the electrically conductive material and is continuous with the electrically conductive material that coats the core.

5. The structure of claim 1, where the first upstanding electrode has a three dimensional shape configured to form a multi-domain liquid crystal display electrode.

6. The structure of claim 1, where the first upstanding electrode comprises at least in part a substantially linear three dimensional shape and where the first planar electrode comprises at least in part a substantially linear shape that intersects the first upstanding electrode.

7. The structure of claim 1, where the pixel of a liquid crystal display further comprises at least one auxiliary electrode disposed on the first surface.

8. The structure of claim 1, where the first upstanding electrode and the first planar electrode are biased to a first potential, and further comprising a second planar electrode biased to a common potential, the second electrode being disposed beneath the first surface and separated from the first upstanding electrode and the first planar electrode by a layer of dielectric material.

9. The structure of claim 1, where the first upstanding electrode has a ratio of height to width of greater than 10.

10. The structure of claim 1, where the first upstanding electrode and the first planar electrode are biased to a first potential, and further comprising a second planar electrode biased to a variable potential, the second electrode being disposed over the second surface and separated from the first upstanding electrode and the first planar electrode by the liquid crystal material.

11. The structure of claim 1, where the first upstanding electrode and the first planar electrode are biased to a first potential, and further comprising a second planar electrode biased to a common potential, the second electrode being disposed over the second surface and separated from the first upstanding electrode and the first planar electrode by the liquid crystal material.

12. The structure as in claim 1, further comprising: a second upstanding electrode disposed over the second surface and extending into the liquid crystal material towards the first surface; and a second planar electrode disposed upon the second surface and electrically connected with the second upstanding electrode, the second planar electrode at least partially surrounding the second upstanding electrode, where a combination of the second upstanding electrode and the second planar electrode, and the first upstanding electrode and the first planar electrode, forms at least a portion of the same pixel of the liquid crystal display.

13. The structure of claim 12, where the first upstanding electrode is electrically biased to a first potential and where the second upstanding electrode is electrically biased to a common potential.

* * * * *